(12) United States Patent
Andersson

(10) Patent No.: US 11,025,288 B2
(45) Date of Patent: Jun. 1, 2021

(54) TRANSCEIVER ARRANGEMENT

(71) Applicant: Telefonaktiebolaget LM Ericsson (publ), Stockholm (SE)

(72) Inventor: Kristoffer Andersson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 20 days.

(21) Appl. No.: 16/471,014

(22) PCT Filed: Jan. 16, 2017

(86) PCT No.: PCT/EP2017/050790
§ 371 (c)(1),
(2) Date: Jun. 19, 2019

(87) PCT Pub. No.: WO2018/130310
PCT Pub. Date: Jul. 19, 2018

(65) Prior Publication Data
US 2020/0112328 A1  Apr. 9, 2020

(51) Int. Cl.
*H04B 1/18* (2006.01)
*H04W 16/28* (2009.01)
(Continued)

(52) U.S. Cl.
CPC ............ *H04B 1/18* (2013.01); *H01Q 3/40* (2013.01); *H04B 1/04* (2013.01); *H04B 1/44* (2013.01);
(Continued)

(58) Field of Classification Search
CPC .......... H01Q 21/00; H01Q 3/40; H01Q 1/246; H01Q 25/00; H01Q 3/00; H01Q 3/26;
(Continued)

(56) References Cited

U.S. PATENT DOCUMENTS 3,255,450 A   6/1966   Butler
5,924,020 A * 7/1999   Forssen .................. H01Q 25/00
                                                   342/373
(Continued)

FOREIGN PATENT DOCUMENTS

WO   1997023017 A1   6/1997
WO   1998050981 A1   11/1998
(Continued)

OTHER PUBLICATIONS

Lee, J., "G/T and Noise Figure of Active Array Antennas", IEEE Transactions on Antennas and Propagation, vol. 41 No. 2, Feb. 1, 1993, pp. 241-244, IEEE.

*Primary Examiner* — Philip Sobutka
(74) *Attorney, Agent, or Firm* — Coats & Bennett, PLLC

(57) ABSTRACT

The present disclosure relates to a transceiver arrangement (1) comprising a transceiver device (2) having at least two transceiver ports (8b, 9b, 10b, 11 b), a beamforming network (5), and at least two antenna ports (12a, 12b, 12c, 12d). The transceiver device (2) comprises at least two low-noise amplifier (LNA) arrangements (3a, 3b, 3c, 3d), where each LNA arrangement (3a, 3b, 3c, 3d) is connected to a respective transceiver port (8b, 9b, 10b, 11 b). The beamforming network (5) is arranged between the antenna ports (12a, 12b, 12c, 12d) and the transceiver ports (8b, 9b, 10b, 11 b), whereby a radio frequency (RF) signal received on an antenna port (12a, 12b, 12c, 12d) traverses the beamforming network (5) prior to being received on the transceiver ports (8b, 9b, 10b, 11 b). In a receive mode configuration of the transceiver arrangement, the beamforming network (5) is arranged to provide a beam-forming function, whereby the RF signal received on an antenna port is received on the transceiver ports with specific respective phase shifts.

13 Claims, 11 Drawing Sheets

(51) Int. Cl.
*H04B 7/06* (2006.01)
*H01Q 21/00* (2006.01)
*H01Q 3/40* (2006.01)
*H04B 1/04* (2006.01)
*H04B 1/44* (2006.01)

(52) U.S. Cl.
CPC ... *H04B 7/0617* (2013.01); *H04B 2001/0408* (2013.01)

(58) Field of Classification Search
CPC .......... H04B 7/0617; H04B 1/18; H04B 1/44; H04B 7/10; H04B 7/0413; H04B 1/04; H04B 2001/0408; H04W 16/28
See application file for complete search history.

(56) References Cited

U.S. PATENT DOCUMENTS

| | | | | |
|---|---|---|---|---|
| 6,104,935 | A | 8/2000 | Smith et al. | |
| 6,320,540 | B1* | 11/2001 | Meredith | H01Q 3/26 342/174 |
| 6,321,066 | B1* | 11/2001 | Katz | H04W 16/28 455/25 |
| 6,470,192 | B1* | 10/2002 | Karlsson | H01Q 1/246 455/25 |
| 7,664,533 | B2* | 2/2010 | Logothetis | H01Q 1/246 342/368 |
| 7,970,348 | B2* | 6/2011 | Hagerman | H04W 16/28 370/203 |
| 8,085,199 | B2* | 12/2011 | Grau Besoli et al. | H04B 17/104 342/373 |
| 9,715,609 | B1* | 7/2017 | Fink | G06K 7/10366 |
| 10,218,478 | B2* | 2/2019 | Kim | H04B 7/0617 |
| 2003/0179138 | A1* | 9/2003 | Chen | G06F 1/1616 342/372 |
| 2004/0160374 | A1* | 8/2004 | Johansson | H01Q 1/246 343/757 |
| 2005/0170788 | A1* | 8/2005 | Tanaka | H03G 1/0088 455/73 |
| 2008/0246663 | A1* | 10/2008 | Fox | H01Q 3/2652 342/373 |
| 2010/0233975 | A1* | 9/2010 | Wu | H04W 52/52 455/115.1 |
| 2011/0255434 | A1* | 10/2011 | Ylitalo | H01Q 1/246 370/252 |
| 2012/0062330 | A1* | 3/2012 | Penn | H04B 1/40 332/105 |
| 2013/0044028 | A1 | 2/2013 | Lea et al. | |
| 2015/0098524 | A1* | 4/2015 | Ling | H04B 1/0475 375/297 |
| 2017/0033853 | A1* | 2/2017 | Kim | H04B 7/0417 |
| 2017/0117629 | A1* | 4/2017 | Thoreback | H01Q 3/40 |
| 2017/0272223 | A1* | 9/2017 | Kim | H04B 7/0639 |
| 2017/0301630 | A1* | 10/2017 | Nguyen | H01L 23/66 |
| 2017/0324160 | A1* | 11/2017 | Khoury | H01Q 1/526 |
| 2017/0366242 | A1* | 12/2017 | Lee | H01Q 1/243 |
| 2018/0048345 | A1* | 2/2018 | Pehlke | H04B 1/40 |
| 2018/0048358 | A1* | 2/2018 | Li | H04B 7/0404 |
| 2018/0138592 | A1* | 5/2018 | Derneryd | H01Q 3/40 |
| 2018/0175916 | A1* | 6/2018 | Rowell | H01Q 3/40 |
| 2019/0081693 | A1* | 3/2019 | Eitan | H01Q 3/36 |
| 2019/0190575 | A1* | 6/2019 | Stjernman | H01Q 1/246 |
| 2019/0273519 | A1* | 9/2019 | Shinozaki | H04B 1/0057 |

FOREIGN PATENT DOCUMENTS

| | | | |
|---|---|---|---|
| WO | 2007010274 | A1 | 1/2007 |
| WO | 2015152782 | A1 | 10/2015 |
| WO | WO-2015152782 | A1 * | 10/2015 ........... H04B 7/0695 |

* cited by examiner

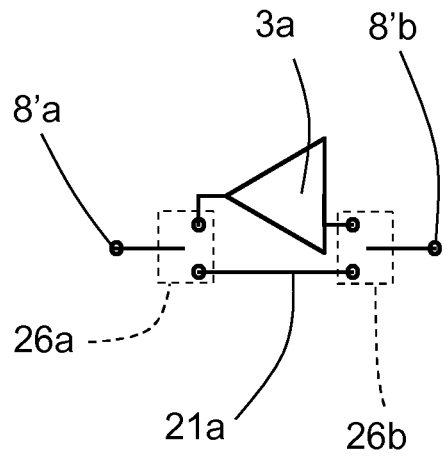
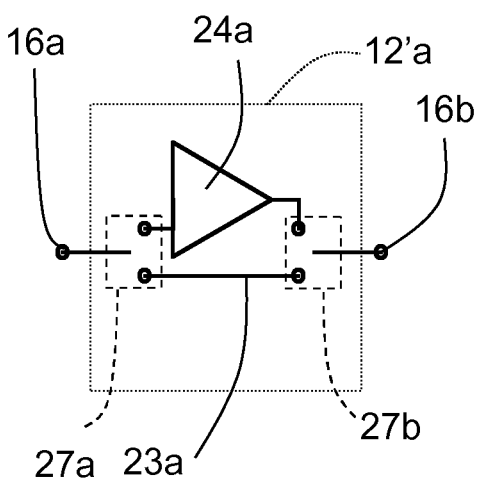
FIG. 10A　　　　　　　　FIG. 10B
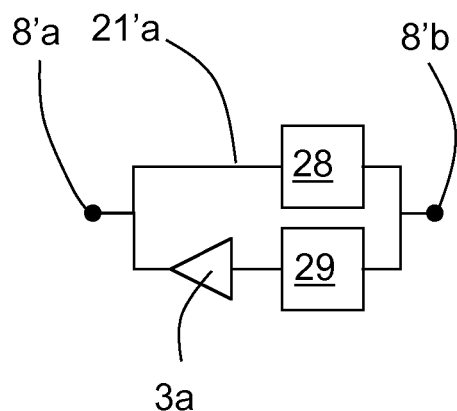
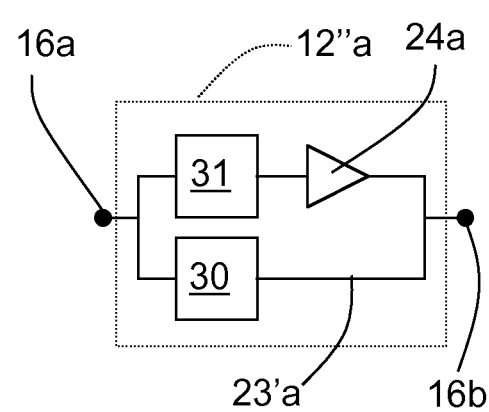
FIG. 11A　　　　　　　　FIG. 11B

TRANSCEIVER ARRANGEMENT

TECHNICAL FIELD

The present disclosure relates to a transceiver arrangement comprising a transceiver device having at least two transceiver ports, a beamforming network, and at least two antenna ports. The transceiver device comprises at least two low-noise amplifier (LNA) arrangements, where each LNA arrangement is connected to a respective transceiver port.

BACKGROUND

In many fields of communication, as well as in radar applications, interfacing front-ends to related circuitry in active array antennas is required. The front-end of a pulsed radar or time division duplex communication system typically includes a transmit branch and a receive branch. The transmit branch generally consists of a driver amplifier, power amplifier (PA) and filtering, while the receive branch generally consist of a low noise amplifier (LNA) and a signal filtering arrangement. A transmit/receive switch device is used to select branch depending on whether the front-end should receive or transmit signals.

The performance of such a radar or communication system is heavily dependent on transmitted output power, power added efficiency in a transmit mode, and noise figure in a receive mode.

One alternative is to have the front-end connected directly to the antenna elements. In a receive mode, active array antennas are very susceptible to interference, mostly due to poor effective spatial selectivity of the receiver. Since each LNA in this case is directly connected to each antenna element, each LNA is associated with the relatively wide antenna beam of a single antenna element. This leads to that interferers within these wide antenna beams are received by the corresponding LNA.

For a digital beam-forming system, having a plurality of antenna beams, the capability of rejecting interferers will be dependent on the effective coherence of the array. For best in-band performance each element should be driven by its own oscillator so that the phase noise is averaged out. However, for separate oscillators, the coherence to interferers is partially lost. When coherence is lost, interferers will be rejected with the element pattern of a single antenna.

There is thus a desire to provide a transceiver arrangement that has reduced phase noise requirements and which has a reduced susceptibility to interference.

SUMMARY

It is an object of the present disclosure to provide a transceiver arrangement that has reduced phase noise requirements and which has a reduced susceptibility to interference Said object is obtained by means of a transceiver arrangement comprising a transceiver device having at least two transceiver ports, a beamforming network, and at least two antenna ports. The transceiver device comprises at least two low-noise amplifier (LNA) arrangements, where each LNA arrangement is connected to a respective transceiver port. The beamforming network is arranged between the antenna ports and the transceiver ports, whereby a radio frequency (RF) signal received on an antenna port traverses the beamforming network prior to being received on the transceiver ports. In a receive mode configuration of the transceiver arrangement, the beamforming network is arranged to provide a beamforming function, whereby the RF signal received on an antenna port is received on the transceiver ports with specific respective phase shifts.

By means of this arrangement, a plurality of advantages are provided. Mainly, the LNA arrangements are connected to beam-formed antenna ports which for example provides spatial selectivity by suppressing users in adjacent sectors as well as unwanted interferers. This enables relaxation of the receiver specification in terms of noise figure, linearity and phase noise.

According to an example, in a transmit mode configuration of the transceiver arrangement, the beamforming network is arranged to provide a pass-through function that enables each transceiver port to be connected to a single respective antenna port.

This provides an advantage in the form of a possibility to by-pass the beamforming network, enabling other functions.

According to another example, the transceiver arrangement comprises at least two power amplifier (PA) arrangements, where each PA arrangement is connected to a respective transceiver port, where the LNA arrangements and the PA arrangements are pair-wise arranged in a common transmit/receive front end arrangement.

This provides an advantage of having a compact structure with PA arrangements and LNA arrangements.

According to another example, each pair of LNA arrangement and PA arrangement comprises a first common port and a second common port, where each first common port is connected to a corresponding network port of a controllable beamforming network comprised in the transceiver device. Each second common port coincides with a corresponding transceiver port. For each pair of LNA arrangement and PA arrangement, a corresponding switching arrangement is adapted to switch the common first port and the common second port between a corresponding LNA arrangement and PA arrangement for the receive mode configuration and the transmit mode configuration, respectively.

This provides an advantage of having a transmit mode configuration where full power is possible to transmit at the antenna ports regardless of number of beams used.

According to another example, the beamforming network comprises at least two beamformed ports and at least two beam ports. In the receive mode configuration, each beamformed port corresponds to a certain antenna beam, having a certain pointing direction. Each transceiver port is connected to a corresponding antenna port via a corresponding beamformed port and corresponding beam port. The beamforming network is reconfigurable such that, in the transmit mode configuration, each one of said corresponding beamformed port and said corresponding beam port are directly connected to each other.

This provides an advantage of having a beamforming network that enables LNA arrangements are connected to beam-formed antenna ports in a receive mode configuration, and enables the PA arrangements to be connected to the antenna ports without intermediate beamforming.

According to another example, each antenna port comprises a corresponding power amplifier (PA) arrangement and is connected to the beamforming network, where each antenna port comprises a pass-through function that enables each PA arrangement to be by-passed in the receive mode configuration.

This provides an advantage of having a versatile structure with PA arrangements and LNA arrangements.

According to another example, the pass-through function is in the form of a transmitter by-pass branch for each PA arrangement, such that in the receive mode configuration each transmitter by-pass branch connects a corresponding antenna first sub-port to a corresponding antenna second sub-port, by-passing the corresponding PA arrangement. In a transmit mode configuration, each PA arrangement is connected between a corresponding antenna first sub-port and a corresponding antenna second sub-port, where each antenna second sub-port is arranged to be connected to a corresponding antenna device.

This provides an advantage of having a beamforming network that enables LNA arrangements are connected to beam-formed antenna ports in a receive mode configuration, and enables the PA arrangements to be connected to the antenna ports without intermediate beamforming.

According to another example, the LNA arrangements are arranged in a receiver front end arrangement that in turn comprises a receiver by-pass branch for each LNA arrangement. In the transmit mode configuration, each receiver by-pass branch connects a receiver first port with a corresponding receiver second port by-passing the corresponding LNA arrangement. In the receive mode configuration, each LNA arrangement is connected between a corresponding receiver first port and a corresponding receiver second port. Each receiver second port coincides with a corresponding transceiver port and each receiver first port is connected to a corresponding network port of a controllable beamforming network comprised in the transceiver device.

According to another example, the beamforming network comprises at least two beamformed ports and at least two beam ports. In the receive mode configuration, each beamformed port corresponds to a certain antenna beam, where each beam port is connected to a corresponding antenna first sub-port, and each beamformed port is connected to a corresponding receiver second port.

This provides an advantage of having a beamforming network that enables LNA arrangements are connected to beam-formed antenna ports in a receive mode.

According to another example, each by-pass branch is connected to and disconnected from its corresponding ports by means of a corresponding switch arrangement.

This provides an advantage of having an uncomplicated switch arrangement.

According to another example, each receiver by-pass branch comprises a first by-pass filter that has a pass-band for at least one transmitting frequency band, and each LNA arrangement is connected in cascade with a corresponding first cascade filter that has a pass-band for at least one receiving frequency band. Each transmitter by-pass branch comprises a second by-pass filter that has a pass-band for at least one receiving frequency band, and each PA arrangement is connected in cascade with a corresponding second cascade filter that has a pass-band for at least one transmitting frequency band.

This provides an advantage of having a reliable switch arrangement.

According to another example, the beamforming network is constituted by a Butler matrix.

According to another example, the Butler matrix comprises a plurality of hybrids.

According to another example, when the beamforming network is re-configurable, each hybrid comprises a first hybrid branch with a first hybrid port and a second hybrid port, a second hybrid branch with a third hybrid port and a fourth hybrid port, a first hybrid switch and a second hybrid switch. The first hybrid switch is arranged to ground a first connection between the first hybrid branch and the second hybrid branch when closed, and the second hybrid switch is arranged to ground a second connection between the first hybrid branch and the second hybrid branch when closed. When the hybrid switches are closed, the first hybrid branch and the second hybrid branch are isolated from each other, where the first hybrid port and the second hybrid port are only connected to each other and the third hybrid port and the fourth hybrid port are only connected to each other.

This provides an advantage of providing an uncomplicated and reliable a re-configurable Butler matrix.

BRIEF DESCRIPTION OF THE DRAWINGS

The present disclosure will now be described more in detail with reference to the appended drawings, where:

FIG. 10A shows a schematical circuit diagram for first example of an LNA arrangement and a receiver by-pass branch;

FIG. 10B shows a schematical circuit diagram for first example of a PA arrangement and a transmitter by-pass branch;

FIG. 11A shows a schematical circuit diagram for second example of an LNA arrangement and a receiver by-pass branch;

FIG. 11B shows a schematical circuit diagram for second example of a PA arrangement and a transmitter by-pass branch;

DETAILED DESCRIPTION

Figure 1:
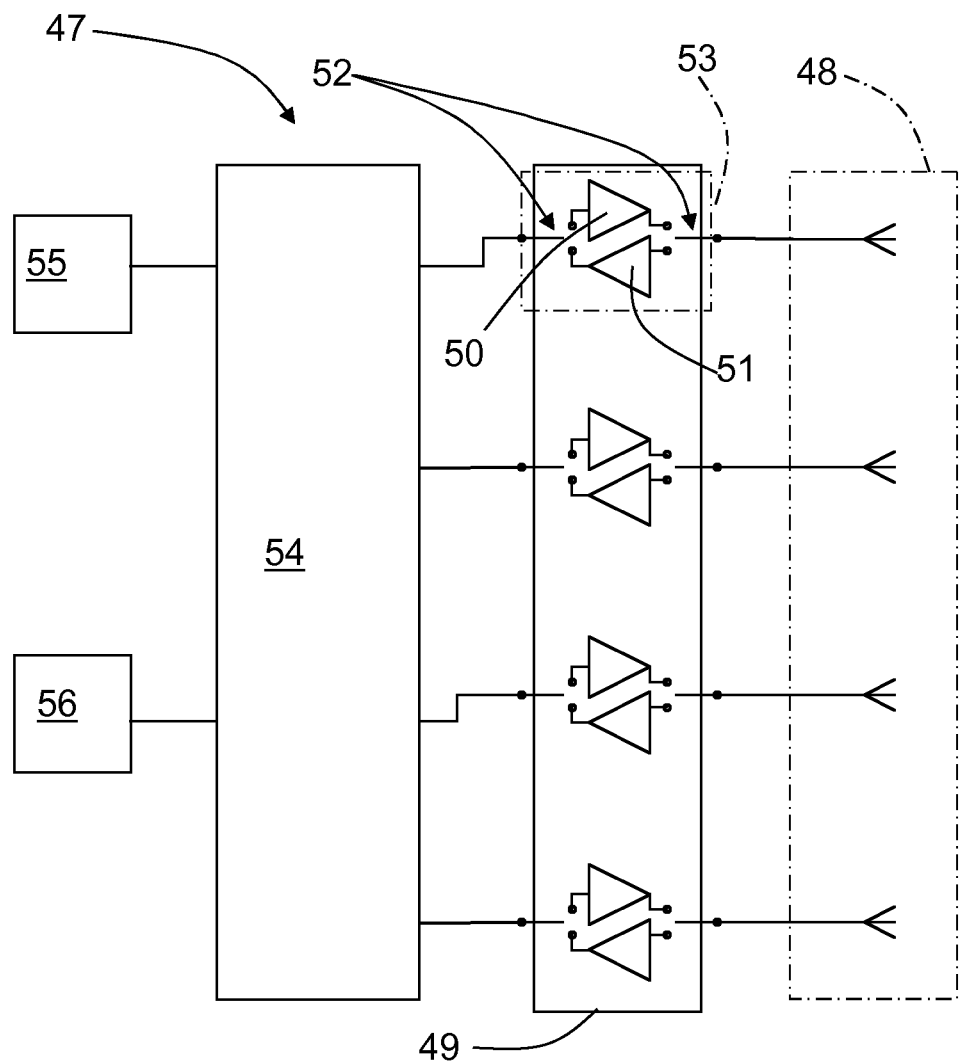
FIG. 1 shows a schematical circuit diagram for a time division duplex (TDD) system.

FIG. 1 shows a schematical circuit diagram for a time division duplex (TDD) system 47 that can be used for radar or communication. Behind a plurality of antennas in an array antenna 48 there is a transmit/receive front-end 49 which contains a plurality of sets 53 (only one denoted in FIG. 1 for reasons of clarity) of a power amplifier 50 (PA), a low noise amplifier 51 (LNA) and a transmit/receive switch 52. The switch 52 is used to select between transmit (TX) and receive (RX) mode. Alternatively, the switch 52 can be replaced with circulators to discriminate between transmitted and received signals.

In a transmit mode, it is well-known that by controlling the phase and amplitude to the front end 49 by means of a digital beamforming network 54 that is connected to a receiver branch 55 and transmitter branch 56, a signal can be directed to a certain angle, i.e. beam-formed. Such beam-forming can either be done by digital means, as in this example, or by means of a phase shift/amplitude shift in each front-end branch, or by means of a fixed Butler matrix.

In a receive mode, the beam-forming is made after the LNA:s 51 seen from the array antenna 48. Performing RX beam-forming after the LNA:s 51 has the disadvantage that there is no spatial selectivity. This means that each LNA 51 will receive signals from the, relative, wide field of view from a single corresponding antenna element of the array antenna 48. Hence, the LNA:s 51 will be susceptible to interference from interfering transmitters, even if they are spaced far apart from the desired signal. To increase the overall selectivity of the TDD system 47, it is advantageous to perform the beam-forming before the LNA:s 51.

Figure 2:
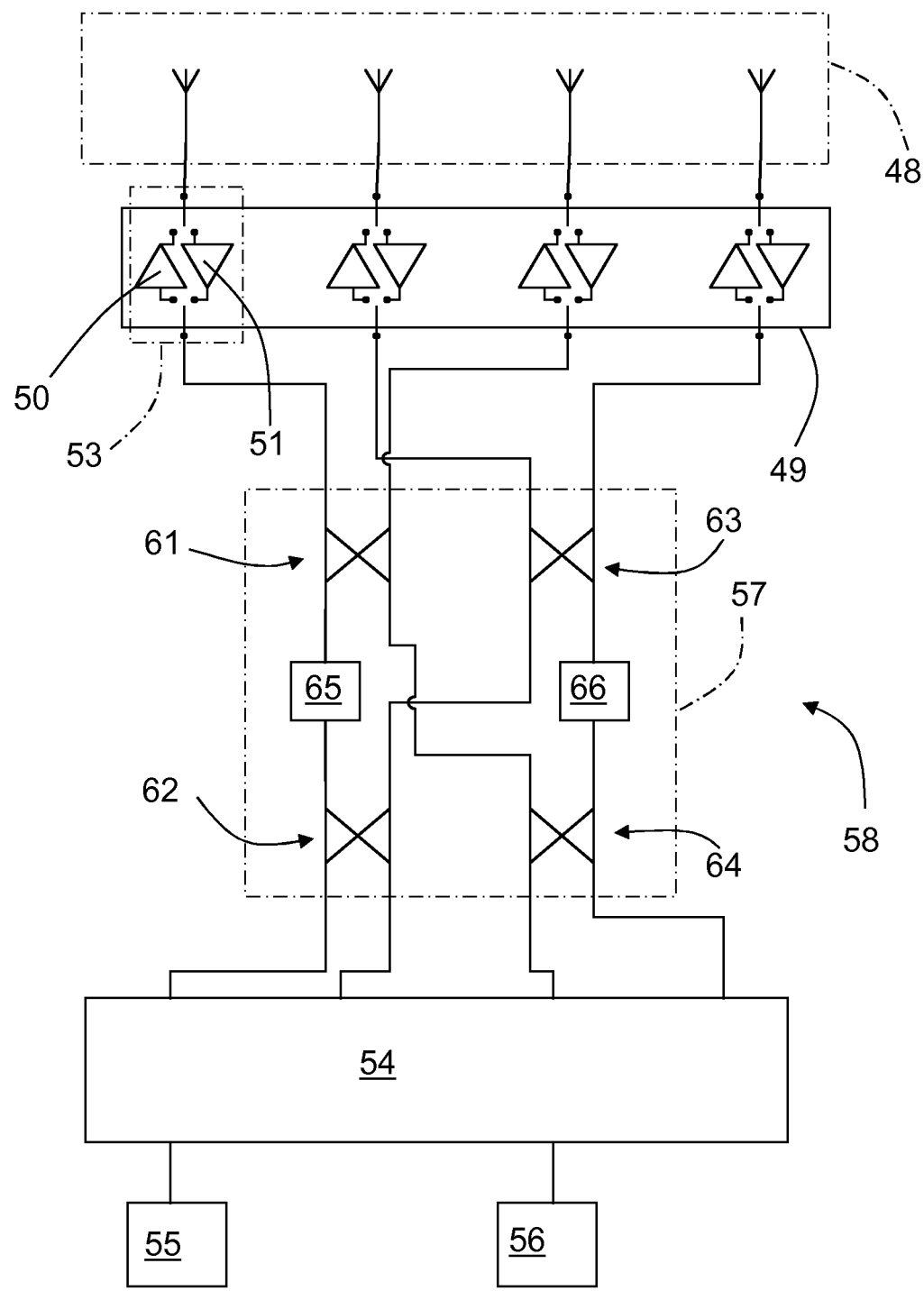
FIG. 2 shows a schematical circuit diagram for a TDD system where a Butler matrix is used as a pre-conditioning beam-former.

FIG. 2 illustrates a similar TDD system 58 where a Butler matrix 57 is used as a pre-conditioning beam-former. For a Butler matrix, each port corresponds to a specific beam direction, and each port is orthogonal to the other. For a 4×4 Butler matrix, adjacent beams are 45 degrees apart, while the beams of an 8×8 Butler matrix, adjacent beams are 22.5 degrees apart. A Butler matrix comprises a passive, and reciprocal network, comprising a plurality of four-port hybrids 61, 62, 63, 64 and phase shifters 65, 66 in a previously known manner, said network having a certain loss.

The transmit/receive front-end 49 is here placed between the array antenna 48 and the Butler matrix 57. In this configuration, the pre-conditioning only works in transmission mode, while the disadvantage for RX described for FIG. 1 remains. Thus this configuration is disadvantageous for achieving spatial selectivity for received signals. A similar configuration is disclosed in U.S. Pat. No. 6,104,935, where the main goal is to increase system power efficiency.

Figure 3:
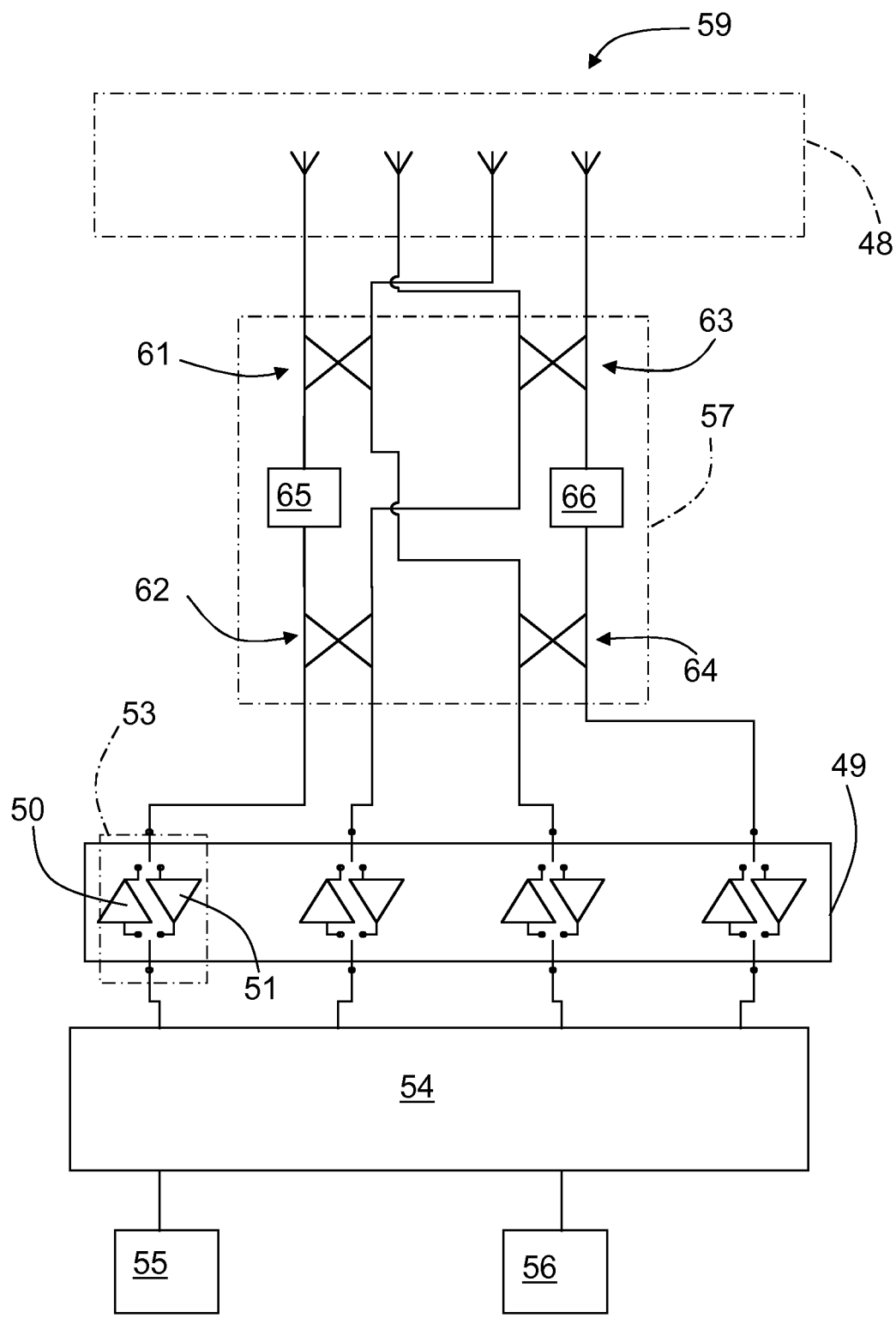
FIG. 3 shows a schematical circuit diagram for a TDD system where a Butler matrix is used as a pre-conditioning beam-former, having another position than in FIG. 2.

FIG. 3 illustrates a corresponding TDD system 59 where the Butler matrix pre-conditioning network 57 is placed between the antenna array 48 and the transmit/receive front-end 49. This configuration will provide spatial selectivity in receive mode due to the beam-forming, allowing the beams to be directed such that interfering transmitters more or less are nulled out. However, due to the orthogonality of the Butler matrix 57, the transmitted output power for a single beam system will be limited to that of a single PA, each PA being associated with one certain antenna beam via the Butler matrix 57.

It is therefore desired to facilitate pre-conditioning beam-forming for received signals; with a suitable pre-conditioning it is possible to obtain spatial selectivity and high linearity in the receiver/LNA plane. A pre-conditioning network will work in tandem with the regular beam-former.

It is also desired to achieve maximum output power regardless of the number of transmitted beams.

Figure 4:
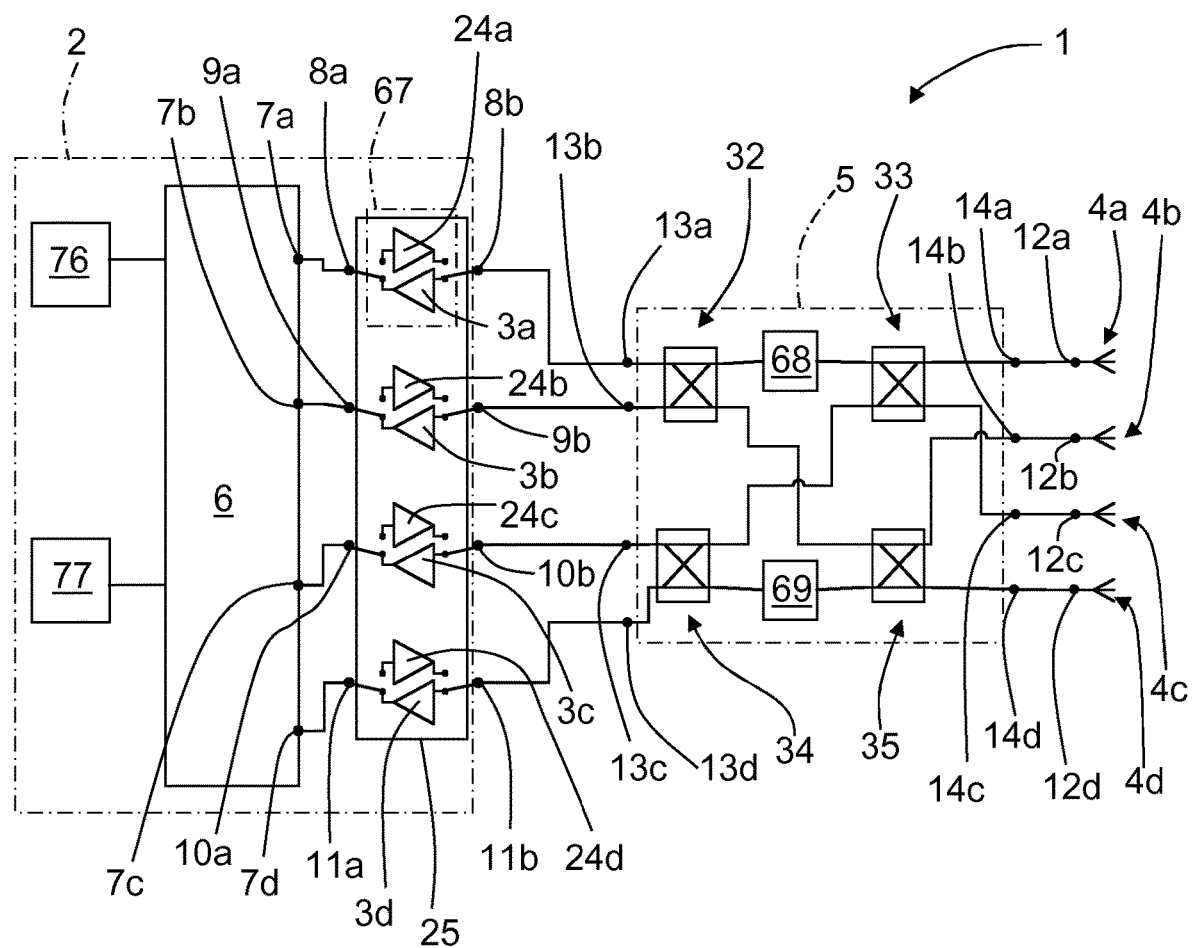
FIG. 4 shows a schematical circuit diagram for a first example of transceiver arrangement in a receive mode configuration.

With reference to FIG. 4, there is a TDD transceiver arrangement 1 comprising a transceiver device 2 having four transceiver ports 8b, 9b, 10b, 11b, a beamforming network 5 in the form of a Butler Matrix, and four antenna ports 12a, 12b, 12c, 12d connected to corresponding antenna devices 4a, 4b, 4c, 4d. The transceiver device 2 furthermore comprises four low-noise amplifier (LNA) arrangements 3a, 3b, 3c, 3d, where each LNA arrangement 3a, 3b, 3c, 3d is connected to a respective transceiver port 8b, 9b, 10b, 11b.

The Butler matrix 5 is arranged between the antenna ports 12a, 12b, 12c, 12d and the transceiver ports 8b, 9b, 10b, 11b, here between the antenna ports 12a, 12b, 12c, 12d and the LNA arrangements 3a, 3b, 3c, 3d, enabling a radio frequency (RF) signal received on an antenna port 12a, 12b, 12c, 12d to traverse the Butler matrix 5 prior to being received on the transceiver ports 8b, 9b, 10b, 11b.

According to the present disclosure, in a receive mode configuration of the transceiver arrangement 1 as illustrated in FIG. 4, the Butler matrix 5 is arranged to provide a beamforming function, such that the RF signal received on an antenna port 12a, 12b, 12c, 12d is received on the transceiver ports 8b, 9b, 10b, 11b with specific respective phase shifts.

Figure 5:
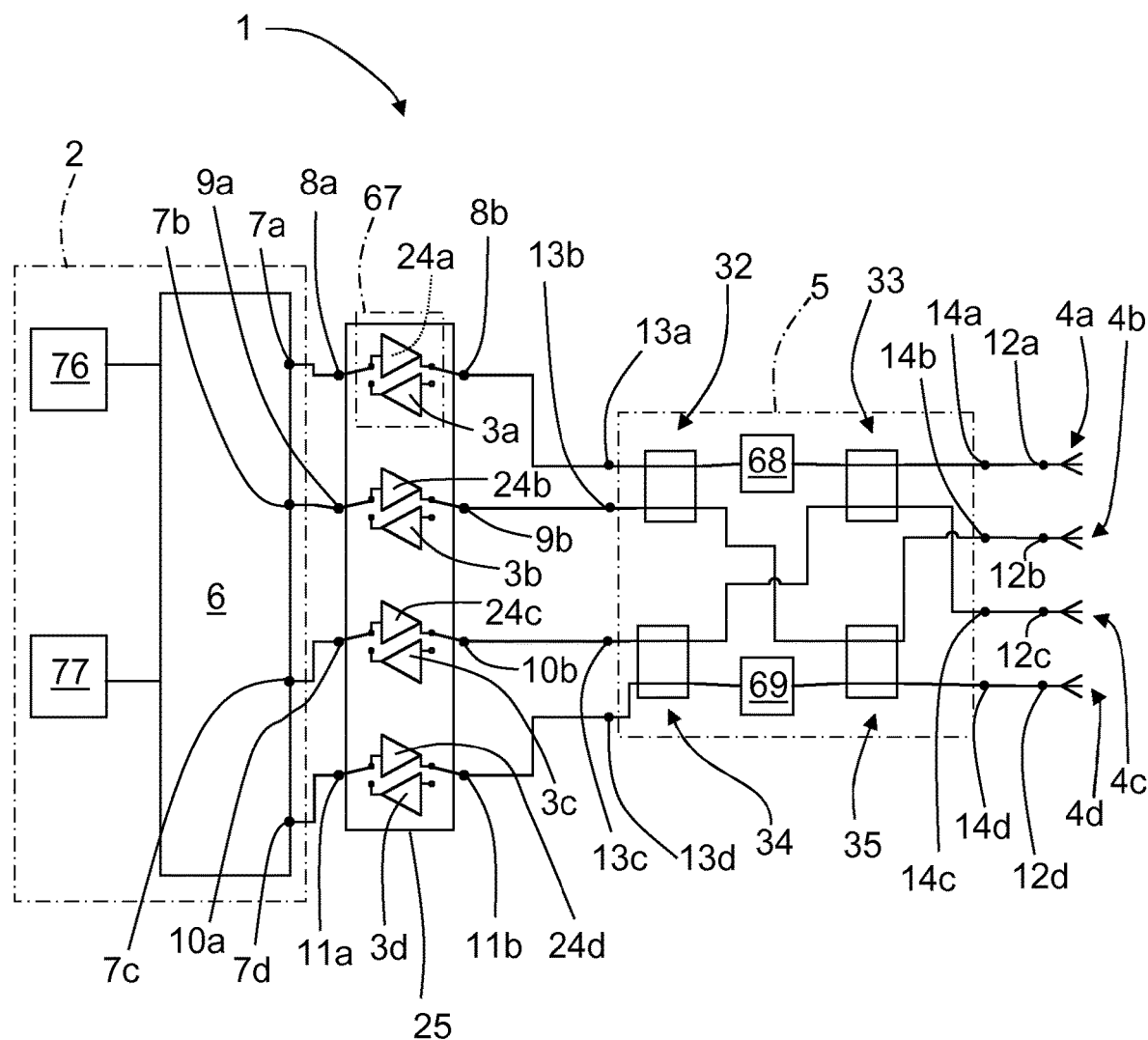
FIG. 5 shows a schematical circuit diagram for the transceiver arrangement in a transmit mode configuration.

With reference to FIG. 5, showing the transceiver arrangement 1 in a transmit mode configuration, the transceiver arrangement 1 comprises four power amplifier (PA) arrangements 24a, 24b, 24c, 24d, where each PA arrangement 24a, 24b, 24c, 24d is connected to a respective transceiver port 8b, 9b, 10b, 11b. The LNA arrangements 3a, 3b, 3c, 3d and the PA arrangements 24a, 24b, 24c, 24d are pair-wise arranged in a common transmit/receive front end arrangement 25. In a transmit mode configuration of the transceiver arrangement 1, the Butler matrix 5 is arranged to provide a pass-through function that enables each transceiver port 8b, 9b, 10b, 11b to be connected to a single respective antenna port 12a, 12b, 12c, 12d. Since the transceiver ports 8b, 9b, 10b, 11b no longer are orthogonal, the output power for single beam is no longer limited to that of a single PA.

More in detail, also with reference to FIG. 4, each pair 67 (only one indicated in FIG. 4 and FIG. 5 for reasons of clarity) of LNA arrangement 3a, 3b, 3c, 3d and PA arrangement 24a, 24b, 24c, 24d comprises a first common port 8a, 9a, 10a, 11a and a second common port 8b, 9b, 10b, 11b. Each first common port 8a, 9a, 10a, 11a is connected to a corresponding network port 7a, 7b, 7d, 7d of a controllable beamforming network 6 comprised in the transceiver device 2. Each second common port 8b, 9b, 10b, 11b coincides with a corresponding transceiver port 8b, 9b, 10b, 11b. The controllable beamforming network 6 is in turn connected to a receiver branch 76 and transmitter branch 77.

Figure 6:
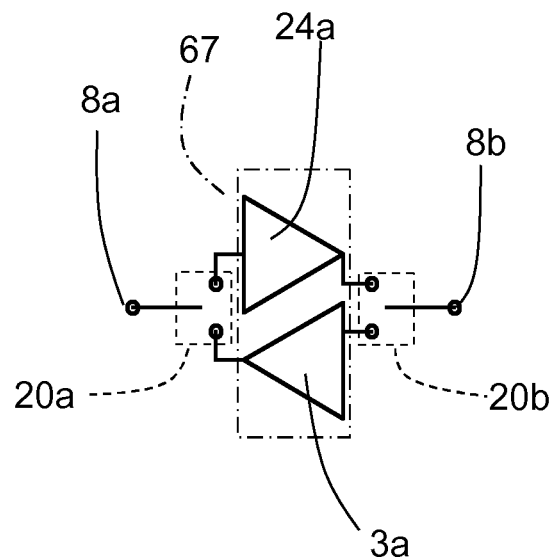
FIG. 6 shows a schematical circuit diagram for one pair of LNA arrangement and PA arrangement.

With reference also to FIG. 6, showing one pair 67 of LNA arrangement 3a, 3b, 3c, 3d and PA arrangement 24a, 24b, 24c, 24d, for each pair 67 of LNA arrangement 3a, 3b, 3c, 3d and PA arrangement 24a, 24b, 24c, 24d, a corresponding switching arrangement 20a, 20b is adapted to switch the common first port 8a, 9a, 10a, 11a and the common second port 8b, 9b, 10b, 11b between a corresponding LNA arrangement 3a, 3b, 3c, 3d and PA arrangement 24a, 24b, 24c, 24d such that a TDD functionality is obtained. In FIG. 4 it is schematically indicated that the LNA arrangements 3a, 3b, 3c, 3d are connected to the respective common ports 8a, 9a, 10a, 11a; 8b, 9b, 10b, 11b, and in FIG. 5 it is schematically indicated that the PA arrangements 24a, 24b, 24c, 24d are connected to the respective common ports 8a, 9a, 10a, 11a; 8b, 9b, 10b, 11b by means of the corresponding switching arrangements.

The Butler matrix 5 as shown in FIG. 4 and FIG. 5 comprises four beamformed ports 13a, 13b, 13c, 13d and four beam ports 14a, 14b, 14c, 14d, where, in the receive mode configuration, each beamformed port 13a, 13b, 13c, 13d corresponds to a certain antenna beam, having a certain pointing direction. Each transceiver port 8b, 9b, 10b, 11b is connected to a corresponding antenna port 12a, 12b, 12c, 12d via a corresponding beamformed port 13a, 13b, 13c, 13d and corresponding beam port 14a, 14b, 14c, 14d. The Butler matrix 5 is here reconfigurable such that, in the transmit mode configuration, each one of said corresponding beamformed port 13a, 13b, 13c, 13d and said corresponding beam port 14a, 14b, 14c, 14d are directly connected to each other.

Figure 7:
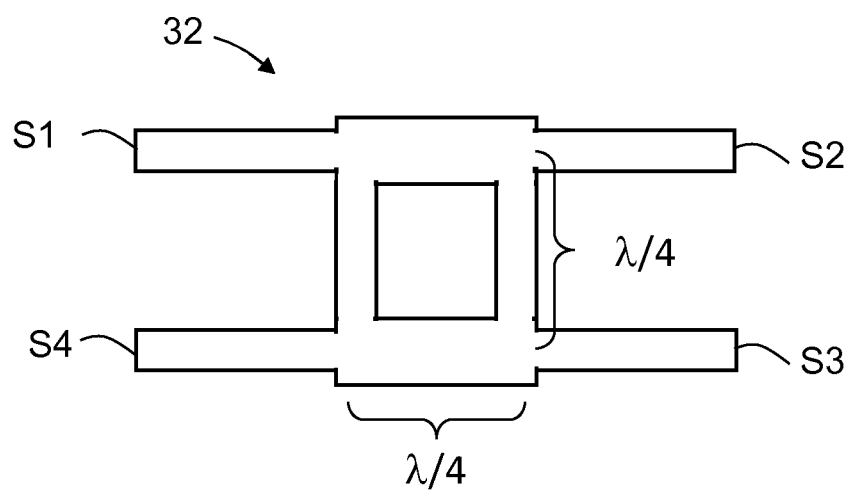
FIG. 7 shows a schematical top view of a general four port hybrid.

For this purpose, the Butler matrix 5 comprises four four-port hybrids 32, 33, 34, 35 and two phase shifters 68, 69. With reference to FIG. 7, showing a general four-port hybrid 60, there is a first port S1, a second port S2, a third port S3 and a fourth port S4. The first port S1 and the second port S2 form a first port pair, and the third S3 and the fourth port S4 form a second port pair. The ports S1, S2, S3, S4 are connected with conductors running in a square, the ports being formed in the corners of the square; the hybrid 60 is symmetrical along its horizontal and vertical axis. The electrical length between two adjacent ports is $\lambda/4$, which corresponds to a phase length of 90 degrees; $\lambda$ refers to the wavelength in the present material.

Since the wavelength changes with frequency, it should be understood that hybrids of this sort are designed for a certain frequency band, having a certain bandwidth, being designed around a certain center frequency. The center frequency is used for calculating the wavelength $\lambda$ in order to obtain the electrical length $\lambda/4$.

Thus power that is input into a port in a port pair, such as the first port S1, is divided equally between the ports S3, S4 in the other port pair with a mutual phase difference of 90 degrees, while none of the input power is output from the second port S2. This is due to the fact that the input signal travels from the first port S1 to the second port S2 two different paths, and arrive at the second port S2 with a mutual phase difference of 180 degrees which leads to cancellation.

Figure 8:
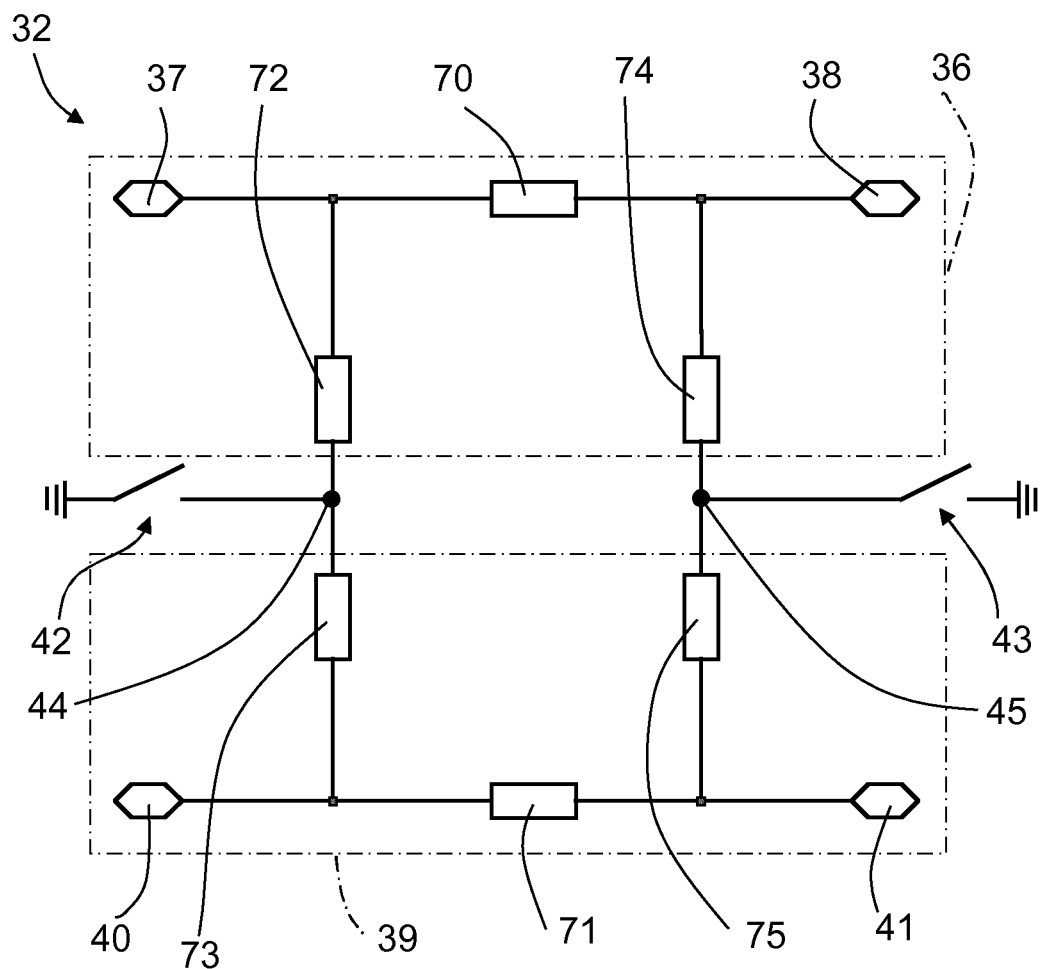
FIG. 8 shows a schematical circuit diagram for a re-configurable four port hybrid.

The reconfigurable butler matrix 5 has two states; one normal state for the receive mode configuration and one pass-through state for the transmit mode configuration. In order to enable this, the hybrids 32, 33, 34, 35 are re-configurable which will be described for one hybrid 32 with reference to FIG. 8, but of course this function is implemented in the same or a similar manner for all hybrids 32, 33, 34, 35. The hybrid 32 comprises a first hybrid branch 36 with a first hybrid port 37 and a second hybrid port 38; a second hybrid branch 39 with a third hybrid port 40 and a fourth hybrid port 41. The hybrid 32 further comprises a first hybrid switch 42 and a second hybrid switch 43, where the first hybrid switch 42 is arranged to ground a first connection 44 between the first hybrid branch 36 and the second hybrid branch 39 when closed. Correspondingly, the second hybrid switch 43 is arranged to ground a second connection 45 between the first hybrid branch 36 and the second hybrid branch 39 when closed.

Between the first hybrid port 37 and a second hybrid port 38 there is a first conductor 70, and between the third hybrid port 40 and the fourth hybrid port 41 there is a second conductor 71, where said conductors 70, 71 each have an electrical length of $\lambda/4$. Between the first hybrid port 37 and the third hybrid port 40 there is a third conductor 72 and a fourth conductor 73 separated by the first connection 44, and between the second hybrid port 38 and the fourth hybrid port 41 there is a fifth conductor 74 and a sixth conductor 75 separated by the second connection 45, where said conductors 72, 73, 74, 75 each have an electrical length of $\lambda/8$.

This means that, when the hybrid switches 42, 43 are closed, the first hybrid branch 36 and the second hybrid branch 39 are isolated from each other, while the first hybrid port 37 and the second hybrid port 38 are only connected to each other and the third hybrid port 40 and the fourth hybrid port 41 are only connected to each other. When the hybrid switches 42, 43 are open thus corresponds to the normal state for the receive mode configuration, and when the hybrid switches 42, 43 are closed thus corresponds to the pass-through state for the transmit mode configuration.

Figure 9:
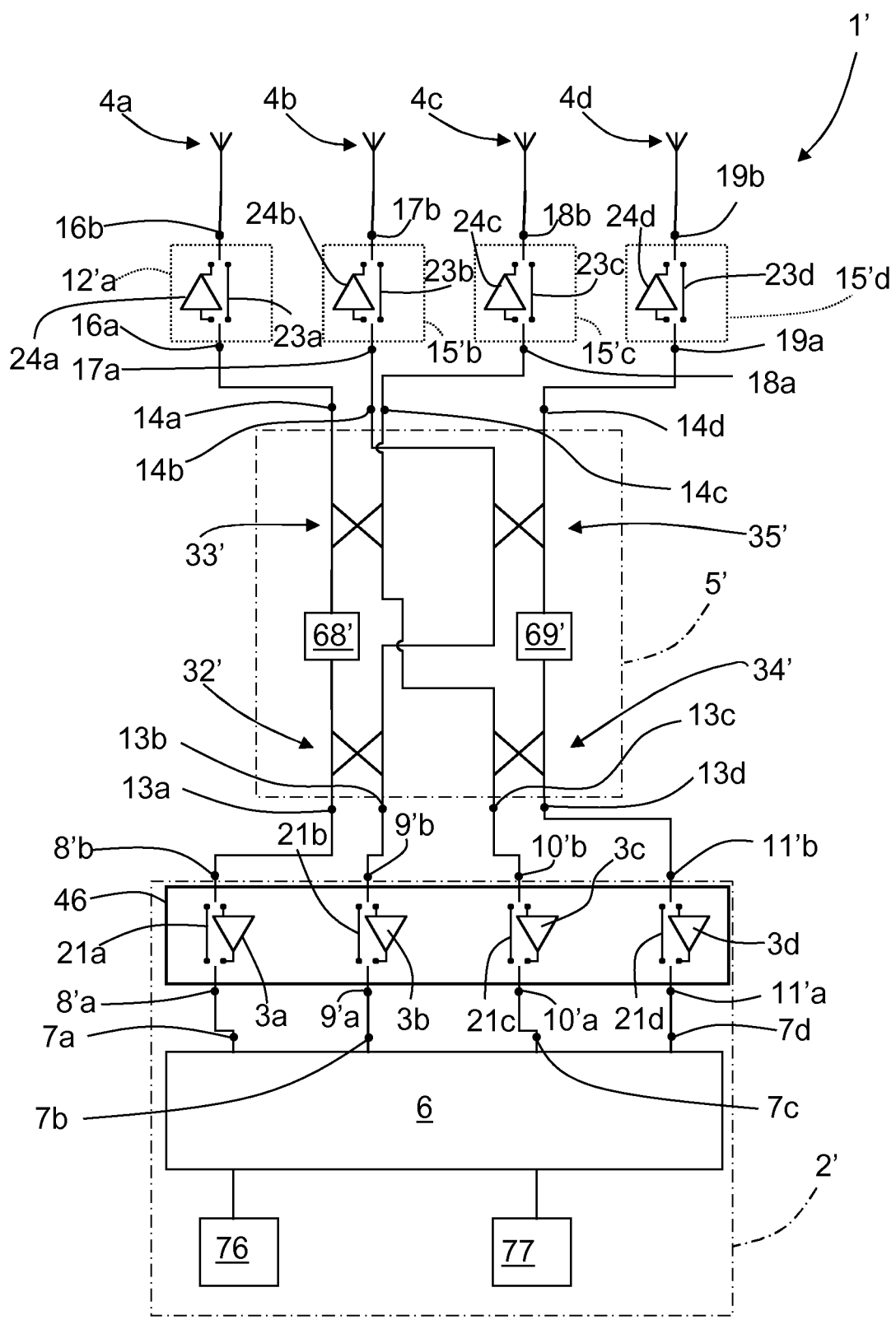
FIG. 9 shows a schematical circuit diagram for a second example of transceiver arrangement.

In the following, a second example will be described with reference to FIG. 9, showing an alternative transceiver arrangement 1'. Here, the PA arrangements 24a, 24b, 24c, 24d are moved to the other side of a Butler matrix 5' while the LNA arrangements 3a, 3b, 3c, 3d are kept at the same place as before. The PA arrangements 24a, 24b, 24c, 24d and the LNA arrangements 3a, 3b, 3c, 3d can be by-passed, such that either the PA arrangements 24a, 24b, 24c, 24d or the LNA arrangements 3a, 3b, 3c, 3d are engaged. An in the previous example, the Butler matrix 5' comprises four four-port hybrids 32', 33', 34', 35' and two phase shifters 68', 69'.

For this purpose, each antenna port 12'a, 12'b, 12'c, 12'd comprises a corresponding PA arrangement 24a, 24b, 24c, 24d and is connected to the beamforming network, the Butler matrix 5', that in this example is not re-configurable. Each antenna port 12'a, 12'b, 12'c, 12'd comprises a pass-through function that enables each PA arrangement 24a, 24b, 24c, 24d to be by-passed in the receive mode configuration. The pass-through function is in the form of a transmitter by-pass branch 23a, 23b, 23c, 23d for each PA arrangement 24a, 24b, 24c, 24d, such that in the receive mode configuration each transmitter by-pass branch 23a, 23b, 23c, 23d connects a corresponding antenna first sub-port 16a, 17a, 18a, 19a to a corresponding antenna second sub-port 16b, 17b, 18b, 19b, by-passing the corresponding PA arrangement 24a, 24b, 24c, 24d. In the transmit mode configuration, each PA arrangement 24a, 24b, 24c, 24d is connected between a corresponding antenna first sub-port 16a, 17a, 18a, 19a and a corresponding antenna second sub-port 16b, 17b, 18b, 19b. Each antenna second sub-port 16b, 17b, 18b, 19b is arranged to be connected to a corresponding antenna device 4a, 4b, 4c, 4d.

The LNA arrangements 3a, 3b, 3c, 3d are arranged in a receiver front end arrangement 46 that in turn comprises a receiver by-pass branch 21a, 21b, 21c, 21d for each LNA arrangement 3a, 3b, 3c, 3d. In the transmit mode configuration, each receiver by-pass branch 21a, 21b, 21c, 21d connects a receiver first port 8'a, 9'a, 10'a, 11'a with a corresponding receiver second port 8'b, 9'b, 10'b, 11'b by-passing the corresponding LNA arrangement 3a, 3b, 3c, 3d. In the receive mode configuration, each LNA arrangement 3a, 3b, 3c, 3d is connected between a corresponding receiver first port 8'a, 9'a, 10'a, 11'a and a corresponding receiver second port 8'b, 9'b, 10'b, 11'b. Each receiver second port 8'b, 9'b, 10'b, 11'b coincides with a corresponding transceiver port 8'b, 9'b, 10'b, 11'b, and each receiver first port 8'a, 9'a, 10'a, 11'a is connected to a corresponding network port 7a, 7b, 7d, 7d of a controllable beamforming network 6 comprised in the transceiver device 2'. The controllable beamforming network 6 is in turn connected to a receiver branch 76 and transmitter branch 77.

The Butler matrix 5' comprises four beamformed ports 13a, 13b, 13c, 13d and four beam ports 14a, 14b, 14c, 14d, where, in the receive mode configuration, each beamformed port 13a, 13b, 13c, 13d corresponds to a certain antenna beam. Each beam port 14a, 14b, 14c, 14d is connected to a corresponding antenna first sub-port 16a, 17a, 18a, 19a, and each beamformed port 13a, 13b, 13c, 13d is connected to a corresponding receiver second port 8'b, 9'b, 10'b, 11'b.

This second example has the advantage of having minimum loss between the PA arrangements 24a, 24b, 24c, 24d and the antenna devices 4a, 4b, 4c, 4d. Furthermore, the orthogonality of the Butler matrix 5' is preserved in both transmit- and receive-mode without any output power constraints.

The by-pass branches 21a, 21b, 21c, 21d; 23a, 23b, 23c, 23d can be devised in several ways; two examples are given below. A first example that is directed to a TDD transceiver arrangement is disclosed below with reference to FIG. 10A and FIG. 10B.

FIG. 10A shows an LNA arrangement 3a and a receiver by-pass branch 21a which are switchably connectable between a receiver first port 8'a and a receiver second port 8'b. A switch arrangement 26a, 26b is adapted for connecting either the LNA arrangement 3a or the receiver by-pass branch 21a between the receiver ports 8'a, 8'b.

FIG. 10B shows an antenna port 12'a comprising a PA arrangement 24a and a transmitter by-pass branch 23a which are switchably connectable between an antenna first sub-port 16a and an antenna second sub-port 16b. A switch arrangement 27a, 27b is adapted for connecting either the PA arrangement 24a or the transmitter by-pass branch 23a between the antenna sub-ports 16a, 16b.

For this first example, the above arrangements are of course implemented in the same or a similar manner for all by-pass branches 21a, 21b, 21c, 21d; 23a, 23b, 23c, 23d. For reasons of generality, FIG. 9, FIG. 10A and FIG. 10B, the bypass-branches are shown in an intermediate position, not indicating any certain mode.

For a TDD system, two different states for transmit- and receive-mode have been enabled by means of dynamically switching. A second example that is directed to an FDD (frequency division duplex) transceiver arrangement is disclosed below with reference to FIG. 11A and FIG. 11B. For FDD operation, the LNA arrangements 3a, 3b, 3c, 3d and PA arrangements 24a, 24b, 24c, 24d should be engaged at the same time but at two different frequency bands, separated by a duplex frequency.

FIG. 11A shows an LNA arrangement 3a and a receiver by-pass branch 21'a which are connected in parallel between a receiver first port 8'a and a receiver second port 8'b. The receiver by-pass branch 21'a comprises a first by-pass filter 28 that has a pass-band for at least one transmitting frequency band and the LNA arrangement 3a, 3b, 3c, 3d is connected in cascade with a corresponding first cascade filter 29 that has a pass-band for at least one receiving frequency band.

FIG. 11B shows an antenna port 12"a comprising a PA arrangement 24a and a transmitter by-pass branch 23'a which are connected in parallel between an antenna first sub-port 16a and an antenna second sub-port 16b. The transmitter by-pass branch 23'a comprises a second by-pass filter 30 that has a pass-band for at least one receiving frequency band, and the PA arrangement 24a is connected in cascade with a corresponding second cascade filter 31 that has a pass-band for at least one transmitting frequency band.

For this second example as well, the above arrangements are of course implemented in the same or a similar manner for all by-pass branches 21'a, 21'b, 21'c, 21'd; 23'a, 23'b, 23'c, 23'd.

In the following, interference rejection and signal to noise ratio will be discussed with reference to FIG. 12A and FIG. 12B, where these Figures are relatively schematical and only intended for illustrating the following discussion.

Figure 12A:
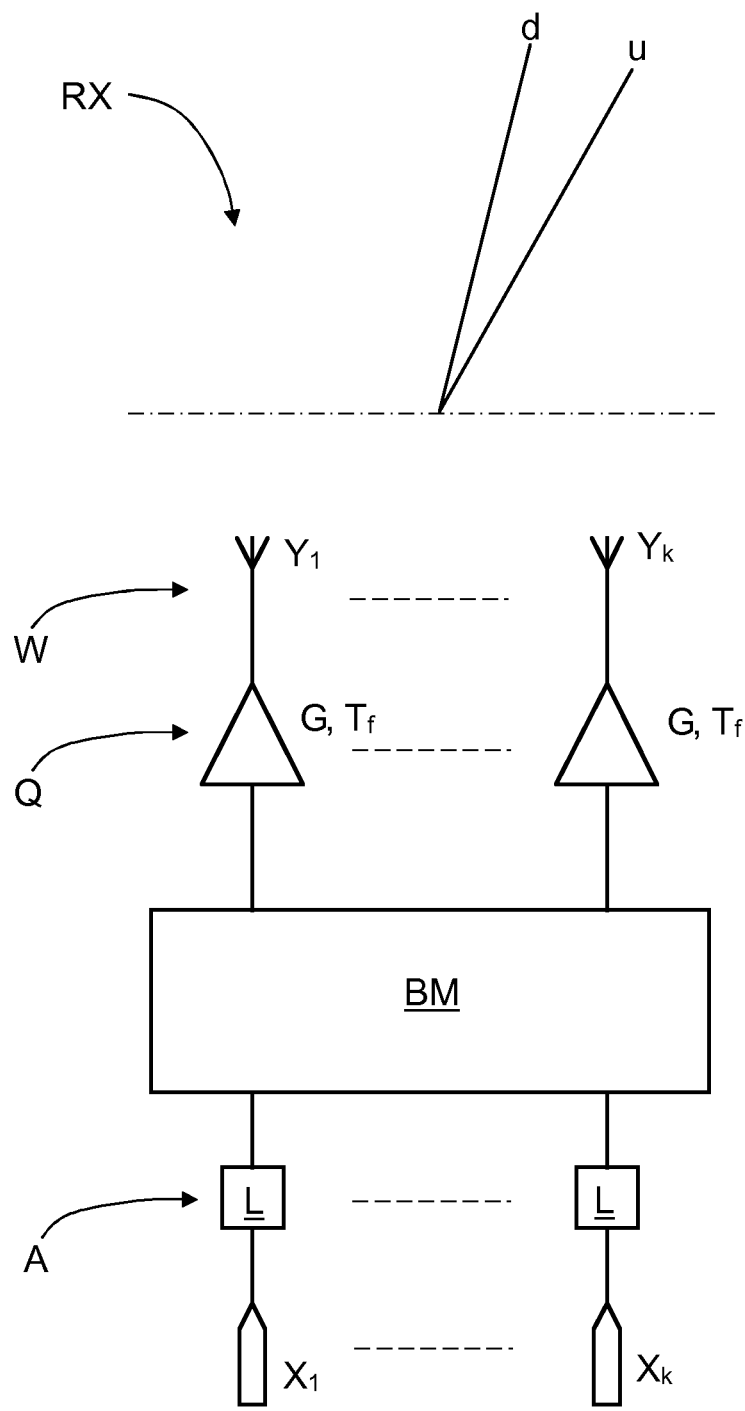
FIG. 12A shows a schematical circuit diagram for receiver having LNA arrangements connected before a Butler matrix.

FIG. 12A shows a schematic representation of a receiver RX having LNA arrangements Q connected before a K×K Butler matrix BM.

The implementation loss of the Butler matrix BM is modeled as attenuators A with insertion loss L connected at the output ports of the Butler matrix BM. The noise temperature $T_{rec}$ at one of receiver output ports $X_k$ can then be calculated as:

$$T_{rec} = \frac{1}{L}\left((L-1)T_{amb} + \sum_{k=1}^{K}\frac{1}{K}GT_f\right) = \frac{(L-1)T_{amb}}{L} + \frac{GT_f}{L},$$

where G and $T_f$ is the power gain and noise temperature of the corresponding LNA arrangement Q, and $T_{amb}$ is ambient noise temperature. The factor 1/K in the summation stems from that the noise power at any of the input ports of the Butler matrix will be equally distributed to its K output ports.

A desired signal having a power d and an interferer signal having a power u are incident on the antenna array W. At the input of each LNA arrangement Q, the signal to interferer ratio (SIR) will be:

$$SIR = \frac{d}{u},$$

and the absolute power level of the interfering signal will be u. After pre-conditioning beamforming, the signal power $D_k$ in the kith receive port can be calculated as:

$$D_k = \frac{1}{L}\left(\sum_{k=1}^{K}\sqrt{\frac{1}{K}Gd}\right)^2 = \frac{KGd}{L}.$$

Here, d is desired signal power and u is unwanted/interfering signal power. Again, the factor 1/K in the summation comes from the multiport scattering of the K×K Butler matrix BM, i.e., the power split between ports. The loss L is modelled as a power gain, or attenuator. The square root in the summation stems from that signals are coherently added in the direction of a main lobe in voltage at the output ports of the Butler matrix BM, which should be compared to the noise which is added in power. The signal-to-noise ratio (SNR) can then be calculated as:

$$SNR = \frac{D_k}{kT_{rec}B} = \frac{Kd}{T_f + \frac{(L-1)}{G}T_{amb}}\frac{1}{Bk_B}.$$

Here, B is the system bandwidth, and kB is Boltzman's constant. Similarly, as for the signal, for the interfering signal u:

$$U_k = \frac{KGuf(\theta_u)}{L},$$

where $\|f(\theta_u)\| \leq 1$ is a correction factor corresponding to the pre-conditioning beam-forming. The SIR at the receive port will then be:

$$SIR = \frac{D_k}{U_k} = \frac{d}{uf(\theta_u)}.$$

This calculation above assumes that the interferer is small enough so that no intermodulation products are present at the LNA outputs.

Figure 12B:
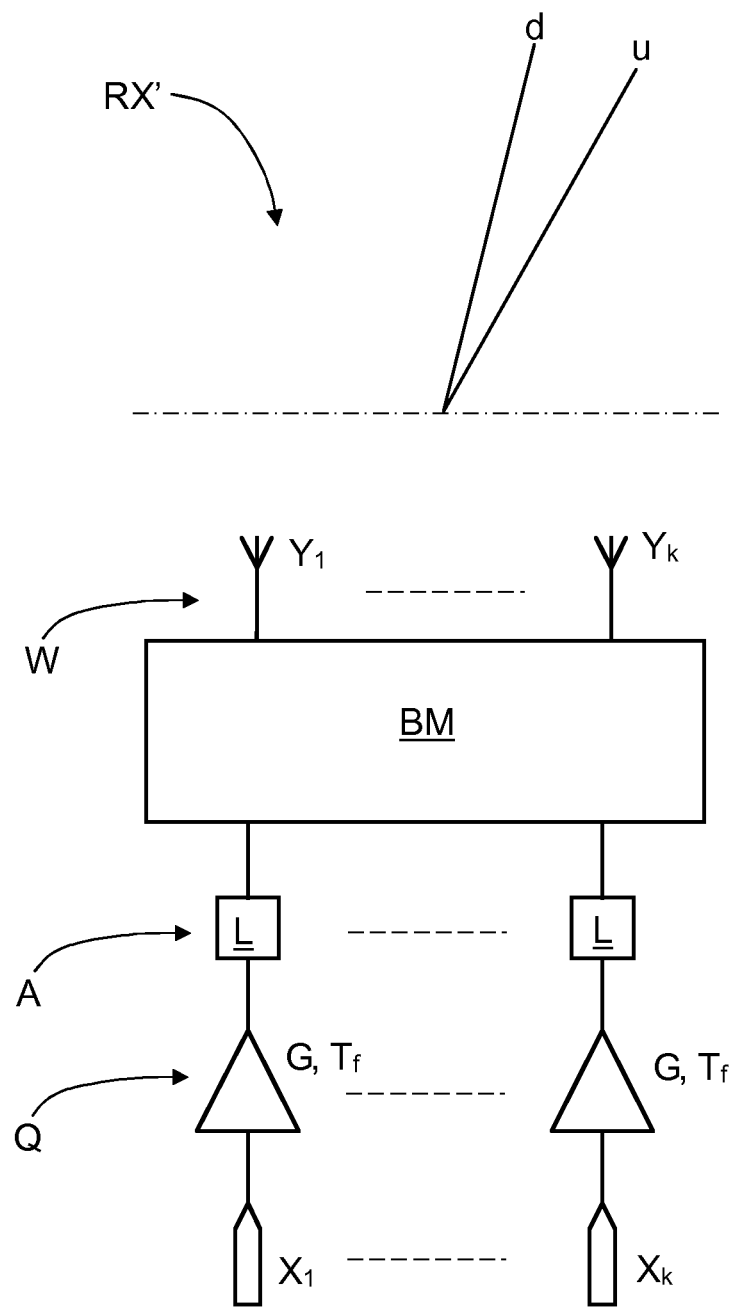
FIG. 12B shows a schematical circuit diagram for receiver having LNA arrangements connected after a Butler matrix.

FIG. 12B shows a schematic representation of a receiver RX' having LNA arrangements A connected after a Butler matrix BM as in the examples of the present disclosure.

The noise temperature $T_{rec}$ at one of the output ports $X_k$ of the receiver RX' can then be calculated as:

$$T_{rec} = \frac{G(L-1)T_{amb}}{L} + GT_f.$$

The signal level at the input of the LNA arrangements Q, for a boresight source relative to the ports beam, will now be beam-formed and the signal level $D_{k,LNA}$ can be calculated as:

$$D_{k,LNA} = \frac{1}{L}\left(\sum_{k=1}^{K}\sqrt{\frac{1}{K}d}\right)^2 = \frac{Kd}{L},$$

and for the interfering signal the interferer level $U_{k,LNA}$ can be calculated as:

$$U_{k,LNA} = \frac{Kuf(\theta_u)}{L}.$$

The SIR at the LNA will in thus, due to pre-conditioning beam-forming be:

$$SIR = \frac{D_{k,LNA}}{U_{k,LNA}} = \frac{d}{uf(\theta_u)}$$

The resulting SNR at the 'boresight receiver port' can then be expressed as:

$$SNR = \frac{GD_{k,LNA}}{kT_{rec}B} = \frac{Kd}{LT_f + (L-1)T_{amb}}\frac{1}{kB},$$

where a boresight receiver port corresponds to a boresight beam direction.

Having LNA arrangements A connected after a Butler matrix BM or any such type of pre-conditioning beam-former, as in the examples of the present disclosure, provides improved SIR at the input of the LNA arrangements, regardless of the location of the interferer. The disadvantage for this improved SIR at the LNA input is a reduced SNR due to the added loss of the beam-former, and higher absolute signal as well as interferer signal levels at the LNA input. Comparing absolute interferer levels for the two solutions gives:

$$\frac{Kuf(\theta_u)}{L} \leq u,$$

and for a loss-loss Butler matrix, the pre-conditioning beam-forming suppression of the interferer, or relative gain between desired and unwanted signal power, must then be better than 1/K to provide a net win in absolute interferer level at the LNA arrangement Q. For an 8 element antenna array W, this corresponds to an interferer being outside the beam width, approximately 22.5 degrees.

In the section below, a more thorough blocking analysis is made, where an interferer signal having a power u, a blocker, is to be blocked out by means of pre-conditioning beamforming. In summary, the LNA arrangement that is active in a blocker direction will be more sensitive to the blocker with a factor of K. However, the blocker will only be affecting that particular LNA arrangement and the remaining K−1 LNA arrangements will see a substantial benefit due to the spatial selectivity. With no pre-conditioning Butler matrix, the whole antenna array W will suffer from an incoming interferer.

The two configurations discussed above with reference to FIG. 12A and FIG. 12B will now be further discussed regarding resilience to blockers. Assuming that the LNA arrangements can be modeled with a static third order on-linearity, the output voltage $y_k$ as a function of input voltage $u_k$, $d_k$ can be written as:

$$y_k = g_m(d_k \cos\theta_d + u_k \cos\theta_u) + g_{m3}(d_k \cos\theta_d + u_k \cos\theta_u)^3,$$

where $u_k$, $d_k$ are input voltages and $\theta_u$, $\theta_d$ are the input frequencies, respectively, for the interfering signal and the desired signal. Generally, $g_m$ is the transconductance of the amplifiers. In this example it is used as voltage gain, a 1 Ohm load implicitly assumed.

Expanding the expression above for the output voltage $y_k$, the following is acquired:

$$y_k = g_m d_k \cos\theta_d + g_m u_k \cos\theta_u + g_{m3} d_k^3 \cos^3\theta_d + g_{m3} u_k^3 \cos^3\theta_u + g_{m3} d_k^2 u_k \cos^2\theta_d \cos\theta_u + 3g_{m3} u_k^2 d_k \cos^2\theta_u \cos\theta_d.$$

It is in the following assumed that the blocker voltage $u_k$ is much larger than the desired signal voltage $d_k$, and that the selectivity (i.e. frequency) is perfect. It is further assumed that the desired signal voltage $d_k$ is relatively small, neglecting higher order terms of the desired signal voltage $d_k$. The apparent voltage A gain is then:

$$A = \frac{y_k}{d_k} = \frac{g_m d_k + \frac{3}{2}g_{m3}u_k^2 d_k}{d_k} = g_m + \frac{3}{2}g_{m3}u_k^2.$$

The parametric gain desensitization due to the blocker is expressed, in dB, as:

$$G = 20\log_{10}\left(1 + \frac{3}{2}\frac{g_{m3}}{g_m}u_k^2\right).$$

A desensitization of 1 dB corresponds to the following condition:

$$\frac{3}{2}\frac{g_{m3}}{g_m}u_k^2 \approx -\frac{1}{9}.$$

The 1 dB desensitization is now calculated for the two different cases. When the pre-conditioning beam-forming is located after the LNA arrangements Q, the blocker voltage at each LNA arrangement is:

$$u_k = \sqrt{u},$$

which results in a "1 dB" blocker input power of:

$$u = -\frac{2}{27}\frac{g_m}{g_{m3}}.$$

For the case where we the pre-conditioning beam-forming is located before the LNA arrangements Q, the blocker voltage at each LNA arrangement is:

$$u_k = \sqrt{\frac{K}{L}uf(\theta_u)},$$

where $f(\theta_u)$ is the spatial rejection factor. The resulting "1 dB" blocker power u is then:

$$u = -\frac{2}{27}\frac{g_m}{g_{m3}}\frac{L}{Kf(\theta_u)}.$$

Thus the "1 dB" desensitization level is degraded with a factor K in the direction of the blocker. In effect, blockers in the beam direction of a "beam-port" will potentially desensitize the LNA arrangements Q; for an 8 element antenna array W, this corresponds to a beam width of 22.5 degrees. However, due to the pre-conditioning beam-forming, the LNA arrangements for the remaining beams will be unaffected.

Each LNA arrangement and PA arrangement suitably comprises several components. According to some aspects, each LNA arrangement comprises a low noise amplifier stage and filtering, and each PA arrangement comprises a driver amplifier stage, a power amplifier stage and filtering.

The present disclosure is not limited to the example described above, but may vary freely within the scope of the appended claims. For example, the transceiver arrangement 1, 1' can be a communications transceiver, a radar device, or any other device adapted for transmitting and receiving electromagnetic waveforms via an antenna arrangement.

The term quarter wavelength used in the description refers to a wavelength that corresponds to a center frequency of an operating frequency band.

It is to be noted that the devices described may comprise several more parts than shown; such as for example control voltage and supply voltage circuitry, control circuitry, DC (Direct Current) blocking components, AC (Alternating Current) blocking components and filter devices. This is common knowledge, and these parts are omitted for the sake of clarity when describing the present disclosure; only those parts and components necessary to provide a clear description of the present disclosure are shown and discussed. In this context, an antenna arrangement may comprise on or more antenna arrays, where each antenna array may comprise on or more antenna elements.

Instead of a Butler matrix, any type of suitable beam-forming network can be used.

Other types of hybrids are of course possible for the beamforming network 5, 5', such as for example Lange-couplers.

Generally, the present disclosure relates to a transceiver arrangement 1 comprising a transceiver device 2 having at least two transceiver ports 8b, 9b, 10b, 11b, a beamforming network 5, and at least two antenna ports 12a, 12b, 12c, 12d, where:

the transceiver device 2 comprises at least two low-noise amplifier (LNA) arrangements 3a, 3b, 3c, 3d, where each LNA arrangement 3a, 3b, 3c, 3d is connected to a respective transceiver port 8b, 9b, 10b, 11b, the beamforming network 5 is arranged between the antenna ports 12a, 12b, 12c, 12d and the transceiver ports 8b, 9b, 10b, 11b, whereby a radio frequency (RF) signal received on an antenna port 12a, 12b, 12c, 12d traverses the beamforming network 5 prior to being received on the transceiver ports 8b, 9b, 10b, 11b, and where:

in a receive mode configuration of the transceiver arrangement, the beamforming network 5 is arranged to provide a beamforming function, whereby the RF signal received on an antenna port is received on the transceiver ports with specific respective phase shifts.

According to an example, in a transmit mode configuration of the transceiver arrangement, the beamforming network 5 is arranged to provide a pass-through function that enables each transceiver port 8b, 9b, 10b, 11b to be connected to a single respective antenna port 12a, 12b, 12c, 12d.

According to an example, the transceiver arrangement comprises at least two power amplifier (PA) arrangements 24a, 24b, 24c, 24d, where each PA arrangement 24a, 24b, 24c, 24d is connected to a respective transceiver port 8b, 9b, 10b, 11b, where the LNA arrangements 3a, 3b, 3c, 3d and the PA arrangements 24a, 24b, 24c, 24d are pair-wise arranged in a common transmit/receive front end arrangement 25.

According to an example, each pair of LNA arrangement 3a, 3b, 3c, 3d and PA arrangement 24a, 24b, 24c, 24d comprises a first common port 8a, 9a, 10a, 11a and a second common port 8b, 9b, 10b, 11b, where each first common port 8a, 9a, 10a, 11a is connected to a corresponding network port 7a, 7b, 7d, 7d of a controllable beamforming network 6 comprised in the transceiver device 2, and where each second common port 8b, 9b, 10b, 11b coincides with a corresponding transceiver port 8b, 9b, 10b, 11b, where furthermore, for each pair of LNA arrangement 3a, 3b, 3c, 3d and PA arrangement 24a, 24b, 24c, 24d, a corresponding switching arrangement 20a, 20b is adapted to switch the common first port 8a, 9a, 10a, 11a and the common second port 8b, 9b, 10b, 11b between a corresponding LNA arrangement 3a, 3b, 3c, 3d and PA arrangement 24a, 24b, 24c, 24d for the receive mode configuration and the transmit mode configuration, respectively.

According to an example, the beamforming network 5 comprises at least two beamformed ports 13a, 13b, 13c, 13d and at least two beam ports 14a, 14b, 14c, 14d, where, in the receive mode configuration, each beamformed port 13a, 13b, 13c, 13d corresponds to a certain antenna beam, having a certain pointing direction, where furthermore each transceiver port 8b, 9b, 10b, 11b is connected to a corresponding antenna port 12a, 12b, 12c, 12d via a corresponding beamformed port 13a, 13b, 13c, 13d and corresponding beam port 14a, 14b, 14c, 14d, where the beamforming network 5 is reconfigurable such that, in the transmit mode configuration, each one of said corresponding beamformed port 13a, 13b, 13c, 13d and said corresponding beam port 14a, 14b, 14c, 14d are directly connected to each other.

According to an example, each antenna port 12'a, 12'b, 12'c, 12'd comprises a corresponding power amplifier (PA) arrangement 24a, 24b, 24c, 24d and is connected to the beamforming network 5', where each antenna port 12'a, 12'b, 12'c, 12'd comprises a pass-through function that enables each PA arrangement 24a, 24b, 24c, 24d to be by-passed in the receive mode configuration.

According to an example, the pass-through function is in the form of a transmitter by-pass branch 23a, 23b, 23c, 23d for each PA arrangement 24a, 24b, 24c, 24d, such that in the receive mode configuration each transmitter by-pass branch 23a, 23b, 23c, 23d connects a corresponding antenna first sub-port 16a, 17a, 18a, 19a to a corresponding antenna second sub-port 16b, 17b, 18b, 19b, by-passing the corresponding PA arrangement 24a, 24b, 24c, 24d, and in a transmit mode configuration, each PA arrangement 24a, 24b, 24c, 24d is connected between a corresponding antenna first sub-port 16a, 17a, 18a, 19a and a corresponding antenna second sub-port 16b, 17b, 18b, 19b, where each antenna second sub-port 16b, 17b, 18b, 19b is arranged to be connected to a corresponding antenna device 4a, 4b, 4c, 4d.

According to an example, the LNA arrangements 3a, 3b, 3c, 3d are arranged in a receiver front end arrangement 46 that in turn comprises a receiver by-pass branch 21a, 21b, 21c, 21d for each LNA arrangement 3a, 3b, 3c, 3d, where, in the transmit mode configuration, each receiver by-pass branch 21a, 21b, 21c, 21d connects a receiver first port 8'a, 9'a, 10'a, 11'a with a corresponding receiver second port 8'b, 9'b, 10'b, 11'b by-passing the corresponding LNA arrangement 3a, 3b, 3c, 3d, and where, in the receive mode configuration, each LNA arrangement 3a, 3b, 3c, 3d is connected between a corresponding receiver first port 8'a, 9'a, 10'a, 11'a and a corresponding receiver second port 8'b, 9'b, 10'b, 11'b, where each receiver second port 8'b, 9'b, 10'b, 11'b coincides with a corresponding transceiver port 8'b, 9'b, 10'b, 11'b, where each receiver first port 8'a, 9'a, 10'a, 11'a is connected to a corresponding network port 7a, 7b, 7d, 7d of a controllable beamforming network 6 comprised in the transceiver device 2'.

According to an example, the beamforming network 5 comprises at least two beamformed ports 13a, 13b, 13c, 13d and at least two beam ports 14a, 14b, 14c, 14d, where, in the receive mode configuration, each beamformed port 13a, 13b, 13c, 13d corresponds to a certain antenna beam, where each beam port 14a, 14b, 14c, 14d is connected to a corresponding antenna first sub-port 16a, 17a, 18a, 19a, and each beamformed port 13a, 13b, 13c, 13d is connected to a corresponding receiver second port 8'b, 9'b, 10'b, 11'b.

According to an example, each by-pass branch 21a, 21b, 21c, 21d; 23a, 23b, 23c, 23d is connected to and disconnected from its corresponding ports 8'a, 9'a, 10'a, 11'a; 8'b, 9'b, 10'b, 11'b; 16a, 17a, 18a, 19a; 16b, 17b, 18b, 19b by means of a corresponding switch arrangement 26a, 26b; 27a, 27b.

According to an example, each receiver by-pass branch 21'a, 21'b, 21'c, 21'd comprises a first by-pass filter 28 that has a pass-band for at least one transmitting frequency band, and where each LNA arrangement 3a, 3b, 3c, 3d is connected in cascade with a corresponding first cascade filter 29 that has a pass-band for at least one receiving frequency band, where furthermore each transmitter by-pass branch 23'a, 23'b, 23'c, 23'd comprises a second by-pass filter 30 that has a pass-band for at least one receiving frequency band, and where each PA arrangement 24a, 24b, 24c, 24d is connected in cascade with a corresponding second cascade filter 31 that has a pass-band for at least one transmitting frequency band.

According to an example, the beamforming network 5, 5' is constituted by a Butler matrix.

According to an example, the Butler matrix 5, 5' comprises a plurality of hybrids 32, 33, 34, 35.

According to an example, when the beamforming network 5 is re-configurable, each hybrid 32, 33, 34, 35 comprises a first hybrid branch 36 with a first hybrid port 37 and a second hybrid port 38, a second hybrid branch 39 with a third hybrid port 40 and a fourth hybrid port 41, a first hybrid switch 42 and a second hybrid switch 43, where the first hybrid switch 42 is arranged to ground a first connection 44 between the first hybrid branch 36 and the second hybrid branch 39 when closed, and where the second hybrid switch 43 is arranged to ground a second connection 45 between the first hybrid branch 36 and the second hybrid branch 39 when closed, such that, when the hybrid switches 42, 43 are closed, the first hybrid branch 36 and the second hybrid branch 39 are isolated from each other, the first hybrid port 37 and the second hybrid port 38 are only connected to each other and the third hybrid port 40 and the fourth hybrid port 41 are only connected to each other.

The invention claimed is:

1. A transceiver arrangement (1), comprising:
   a transceiver device (2) comprising:
      at least two first transceiver ports (8b, 9b, 10b, 11b) and at least two second transceiver ports (8a, 9a, 10a, 11a);
      at least two low-noise amplifier (LNA) arrangements (3a, 3b, 3c, 3d), each arranged between the first and second transceiver ports, where an input of each of the at least two LNA arrangement selectively connects to a respective one of the at least two first transceiver ports and an output of each of the at least two LNA arrangements selectively connects to a respective one of the at least two second transceiver ports when the transceiver arrangement is in a receive mode configuration; and
      a transceiver circuit (76, 77);
   at least two antenna ports (12a, 12b, 12c, 12d); and
   a beamforming network (5, 6) comprising a first beamforming circuit and a second beamforming circuit, the first beamforming circuit arranged between the at least two antenna ports and the at least two first transceiver ports, and the second beamforming circuit arranged between the transceiver circuit and the at least two second transceiver ports, whereby a radio frequency (RF) signal received by one or more of the at least two antenna ports traverses the first beamforming circuit prior to being received on one or more of the at least two first transceiver ports;
   wherein, in the receive mode configuration, the first beamforming circuit is configured to provide a beamforming function for each of the at least two antenna ports, whereby the RF signal received by one or more of the at least two antenna ports is received on the one or more of the at least two first transceiver ports with specific respective phase shifts; and
   wherein, in a transmit mode configuration, the first beamforming circuit is configured to provide a pass-through function that enables each of the at least two first transceiver ports to connect to a single respective one of the at least two antenna ports.

2. The transceiver arrangement of claim 1:
   wherein the transceiver arrangement further comprises at least two power amplifier (PA) arrangements;
   wherein each of the at least two PA arrangements is connected between corresponding ones of the at least two first and second transceiver ports; and
   wherein the LNA arrangements and the PA arrangements are pair-wise arranged in a common transmit/receive front end arrangement.

3. The transceiver arrangement of claim 2:
   wherein the second beamforming circuit comprises a controllable beamforming circuit; and wherein, for each pair of LNA arrangement and PA arrangement, a corresponding switching arrangement is configured to switch the corresponding one of the at least two second transceiver ports and the corresponding one of the at least two first transceiver ports between a corresponding one of the at least two LNA arrangements and a corresponding one of the at least two PA arrangements for the receive mode configuration and the transmit mode configuration, respectively.

4. The transceiver arrangement of claim 3:
wherein the first beamforming circuit comprises at least two beamformed ports and at least two beam ports;
wherein, in the receive mode configuration, each of the at least two beamformed ports corresponds to a certain antenna beam, having a certain pointing direction;
wherein each of the at least two first transceiver ports is connected to a corresponding one of the at least two antenna ports via a corresponding one of the at least two beamformed ports and a corresponding one of the at least two beam ports; and
wherein the first beamforming circuit is reconfigurable such that, in the transmit mode configuration, each one of the at least two beamformed ports and each corresponding one of the at least two beam ports are directly connected to each other.

5. The transceiver arrangement of claim 1:
wherein each of the at least two antenna ports comprises a corresponding power amplifier (PA) arrangement and is connected to the first beamforming circuit; and
wherein each of the at least two antenna ports comprises a pass-through function that enables each PA arrangement to be bypassed in the receive mode configuration.

6. The transceiver arrangement of claim 5, wherein the pass-through function is in the form of a transmitter bypass branch for each PA arrangement, such that:
in the receive mode configuration, each transmitter bypass branch connects a corresponding antenna first sub-port to a corresponding antenna second sub-port, bypassing the corresponding PA arrangement; and
in the transmit mode configuration, each PA arrangement is connected between a corresponding antenna first sub-port and a corresponding antenna second sub-port, where each antenna second sub-port is configured to be connected to a corresponding antenna device.

7. The transceiver arrangement of claim 6:
wherein the at least two LNA arrangements are arranged in a receiver front end arrangement that in turn comprises a receiver bypass branch for each of the at least two LNA arrangements;
wherein, in the transmit mode configuration, each receiver bypass branch connects a corresponding one of the at least two second transceiver port with a corresponding one of the at least two first transceiver ports, bypassing the corresponding one of the at least two LNA arrangements;
wherein, in the receive mode configuration, each of the at least two LNA arrangements is connected between a corresponding one of the at least two first transceiver ports and a corresponding one of the at least two second transceiver ports; and wherein each of the at least two second transceiver ports is connected to a corresponding network port of the second beamforming circuit.

8. The transceiver arrangement of claim 7:
wherein the first beamforming circuit comprises at least two beamformed ports and at least two beam ports;
wherein, in the receive mode configuration, each of the at least two beamformed ports corresponds to a certain antenna beam; and
wherein each of the at least two beam ports is connected to a corresponding antenna first sub-port, and each of the at least two beamformed ports is connected to a corresponding one of the at least two first transceiver ports.

9. The transceiver arrangement of claim 7, wherein each receiver bypass branch and each transmitter bypass branch is connected to and disconnected from its corresponding ports by a corresponding switch arrangement.

10. The transceiver arrangement of claim 7:
wherein each receiver bypass branch comprises a first bypass filter that has a pass-band for at least one transmitting frequency band;
wherein each of the at least two LNA arrangements is connected in cascade with a corresponding first cascade filter that has a pass-band for at least one receiving frequency band;
wherein each transmitter bypass branch comprises a second bypass filter that has a pass-band for at least one receiving frequency band; and
wherein each PA arrangements is connected in cascade with a corresponding second cascade filter that has a pass-band for at least one transmitting frequency band.

11. The transceiver arrangement of claim 1, wherein the first beamforming circuit comprises a Butler matrix.

12. The transceiver arrangement of claim 11, wherein the Butler matrix comprises a plurality of hybrids.

13. The transceiver arrangement of claim 12:
wherein the first beamforming circuit is re-configurable; and
wherein each hybrid comprises:
a first hybrid branch with a first hybrid port and a second hybrid port;
a second hybrid branch with a third hybrid port and a fourth hybrid port; and
a first hybrid switch and a second hybrid switch;
wherein the first hybrid switch is configured to ground a first connection between the first hybrid branch and the second hybrid branch when closed;
wherein the second hybrid switch is arranged to ground a second connection between the first hybrid branch and the second hybrid branch when closed; and
wherein, when the hybrid switches are closed, the first hybrid branch and the second hybrid branch are isolated from each other, the first hybrid port and the second hybrid port are only connected to each other, and the third hybrid port and the fourth hybrid port are only connected to each other.

* * * * *